United States Patent
Rose et al.

(10) Patent No.: US 10,189,305 B2
(45) Date of Patent: Jan. 29, 2019

(54) BICYCLE FRONT WHEEL HUB WITH TORQUE TUBE

(75) Inventors: Russell L. Rose, Manitou Springs, CO (US); Jesse Jakomait, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 556 days.

(21) Appl. No.: 13/219,840

(22) Filed: Aug. 29, 2011

(65) Prior Publication Data

US 2013/0049322 A1    Feb. 28, 2013

(51) Int. Cl.
*B60B 27/00* (2006.01)
*B60B 27/02* (2006.01)

(52) U.S. Cl.
CPC ...... *B60B 27/026* (2013.01); *B60B 2900/212* (2013.01); *B60B 2900/311* (2013.01); *B60Y 2200/132* (2013.01)

(58) Field of Classification Search
CPC ..... B60B 35/004; B60B 35/005; B60B 27/02; B60B 27/023; B60B 27/026; B60B 2900/212; B60B 2900/311; B60Y 2200/132
USPC ...... 280/279, 288, 281.1, 274, 287; 301/111.01, 112, 114, 120, 121, 124.1, 301/131, 125, 110.5; 384/545
See application file for complete search history.

(56) References Cited

U.S. PATENT DOCUMENTS

| | | | | |
|---|---|---|---|---|
| 429,554 A | * | 6/1890 | Kirsch-King | 384/586 |
| 609,371 A | * | 8/1898 | Schroeder | 384/545 |
| 612,401 A | * | 10/1898 | Collmer | 384/545 |
| 5,312,166 A | * | 5/1994 | Nagano | 301/110.5 |
| 5,326,157 A | * | 7/1994 | Nagano | 301/110.5 |
| 5,823,555 A | * | 10/1998 | Ashman | 280/279 |
| 5,984,423 A | | 11/1999 | Becker | |
| 5,997,104 A | * | 12/1999 | Campagnolo | 301/110.5 |
| 6,059,378 A | * | 5/2000 | Dougherty et al. | 301/124.1 |
| 6,089,675 A | * | 7/2000 | Schlanger | 301/124.2 |
| 6,742,849 B1 | * | 6/2004 | Denby | 301/124.2 |
| 7,494,145 B2 | * | 2/2009 | Schroeder et al. | 280/276 |
| 8,113,594 B2 | | 2/2012 | Hayes | |
| 8,485,335 B2 | * | 7/2013 | Schlanger | 192/64 |
| 2004/0165805 A1 | * | 8/2004 | Kanehisa | B60B 1/041 384/545 |
| 2009/0072613 A1 | * | 3/2009 | Inoue et al. | 301/132 |
| 2009/0236818 A1 | * | 9/2009 | Addink | 280/281.1 |
| 2010/0096913 A1 | * | 4/2010 | Veux | 301/110.5 |
| 2011/0049968 A1 | | 3/2011 | Jones et al. | |
| 2012/0195676 A1 | | 8/2012 | Chung | |

FOREIGN PATENT DOCUMENTS

| | | |
|---|---|---|
| DE | 29601870 | 7/1996 |
| DE | 102008013938 | 9/2009 |
| TW | M377343 | 4/2010 |
| TW | 201109229 | 3/2011 |
| TW | M404129 | 5/2011 |

* cited by examiner

*Primary Examiner* — Anne Marie M Boehler

(57) ABSTRACT

A hub for a bicycle, including a hub body, and a torque tube disposed in the hub body. A first mating element is disposed at a first end of the torque tube and a second mating element is disposed at a second end thereof. Each of the first mating element and the second mating element includes an anti-rotation hub feature, and the torque tube transfers torque between the first mating element and the second mating element.

10 Claims, 5 Drawing Sheets

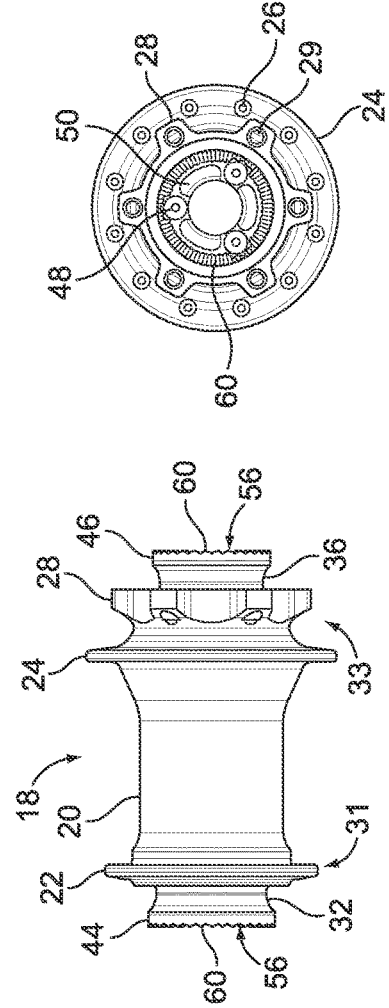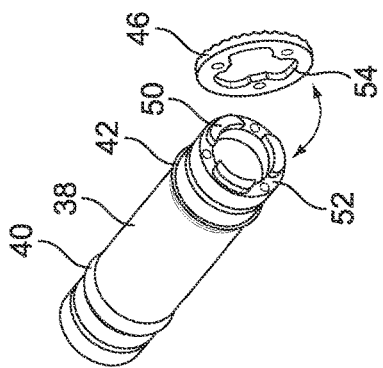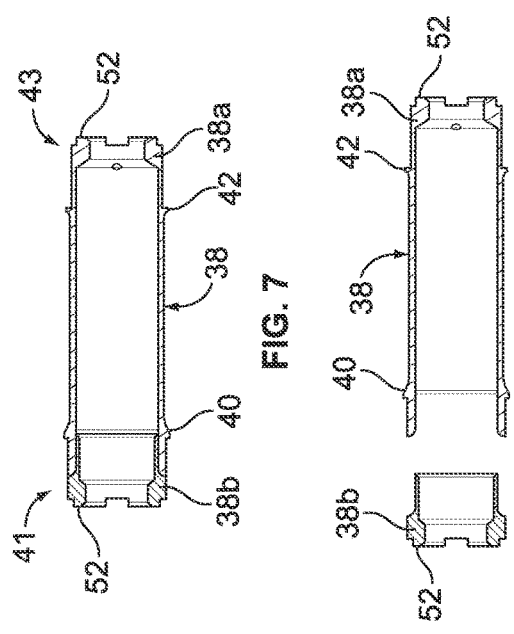

BICYCLE FRONT WHEEL HUB WITH TORQUE TUBE

BACKGROUND OF THE INVENTION

This invention relates to bicycle hubs, and more particularly, to a bicycle front wheel hub. In particular, the invention relates to a bicycle front wheel hub with a torque tube.

A typical bicycle frame set has a bicycle fork for mounting a wheel to the bicycle. A typical fork has a pair of spaced apart fork legs (or at least one fork leg), each leg having a dropout at a terminal end. The dropouts have inner sides (facing each other), outer sides opposite the inner sides, and an elongated aperture formed therein to form a slot to receive a hub for a connection of the wheel to the fork. The hub of the bicycle wheel is mounted on the skewer, and thus a wheel may be mounted and fastened on the bicycle frame by inserting and fastening the skewer into the slot and on the dropout.

Significant torsion forces can be applied to the wheel and thus the fork, such as during braking, steering and from forces encountered by rough terrain, for example. One particular example of such force is generated when braking forces are applied to the wheel by a bicycle disc brake. Disc brakes have typically been used in off-road and racing applications, both downhill and cross-country. Disc brakes include a brake disc mounted on the hub adjacent the center of the wheel and a brake pad mounted adjacent the brake disc. The brake pad engages the brake disc to slow down rotation of the bicycle wheel.

Due to the forces that arise when the disc brake is applied to slow rotation of the bicycle wheel, forces generated by disc brakes can induce a twisting torque which can be detrimental to steering precision.

Bicycles with suspension forks, and in particular telescopic upside down (USD) forks (with stanchions at the bottom) are particularly prone to suffering twisting forces due to steering, braking and operation off-road, for example. This is due to the fact that the USD fork stanchions are only connected through the hub. Typical bicycle hubs have internal rotational connections between the left mounting surface and the right mounting surface which can allow both fork legs of a USD fork to flex and rotate independently—a tendency if minimized improves the functioning of the fork.

There is a demand, therefore, to provide a bicycle with a structure or mechanism that prevents or reduces the effects of torsion forces. The invention satisfies the demand.

SUMMARY OF THE INVENTION

The invention includes a hub for a bicycle that increases the torsion rigidity of an attached front fork. The hub has a tubular member that is essentially one continuous component that connects one fork mounting leg to the other fork mounting leg. The connection created by assembling the hub and fork according to the invention transfers torque, for example created by rider induced handlebar torque, from one fork leg to the other fork leg, thus increasing overall bicycle performance and enhancing rider control. The continuous hub component, which may be referred to as a torque tube, connects the fork legs so that when one fork is twisted, that fork leg's torque is transferred to the opposing fork leg, thereby creating a torsionally stiffer fork (and hub assembly) than with a conventional hub.

These and other features and advantages of the present invention will be more fully understood from the following description of, one or more embodiments of the invention, taken together with the accompanying drawings.

BRIEF DESCRIPTION OF THE DRAWINGS

In the drawings:

FIG. 3 shows a side view of the bicycle hub of FIG. 1;

FIG. 4 shows an end view of the bicycle hub of FIG. 4;

FIG. 5 shows a perspective view of a torque tube and a mating element;

FIG. 6 shows a sectional view of the hub shown in FIG. 3;

FIG. 7 shows a sectional view of the torque tube of FIG. 1;

FIG. 8 shows an exploded sectional view of the torque tube of FIG.

DETAILED DESCRIPTION OF THE PREFERRED EMBODIMENTS

Figure 1:
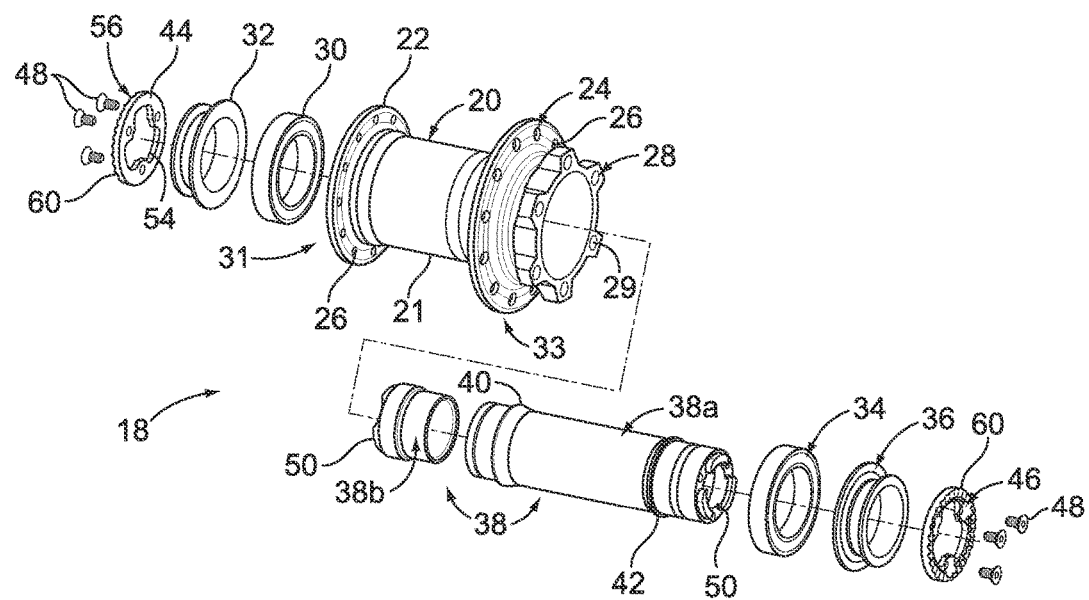
FIG. 1 shows an exploded perspective view of a bicycle hub according to the invention including a torque tube.

Preferred embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second" or "left" and "right" are used for the sake of clarity and not as terms of limitation.

FIGS. 1-8 show a hub 18 for a bicycle front wheel. The hub 18 generally includes a hub body 20 and a torque tube 38 positioned in the hub body. The hub 18 includes a first hub bearing 30 and a second hub bearing 34 spaced from the first hub bearing. The hub bearings 30, 34 are disposed between the hub body 20 and torque tube 38 to permit the hub body to rotate about the torque tube 38. It will be understood that more than two bearings can be used.

The hub body 20 includes a central shell part 21 located generally between a pair of, spaced spoke flanges including a first flange 22 and a second flange 24, each flange including a plurality of spoke holes 26 or some means of capturing the ends of or otherwise providing for the retention of spoke members of a wheel. The central shell part 21 can be cylindrical or other suitable shapes. In this embodiment, the hub body 20 includes a brake rotor mounting flange 28 with a number of brake rotor mounting holes 29 for mounting a brake rotor thereto. The brake rotor mounting flange 28 is shown positioned outboard of the second spoke flange 24.

First hub bearing 30 and second hub bearing 34 are positioned inside the hub body 20 at or near respective ends 31, 33 of the central shell part 21. One of dust seals 32, 36 are provided at or near respective outboard sides of each of the bearings 30, 34 and essentially seal the hub bearings (and the interior of the hub body 20) to contamination and also may function to retain the bearings in place.

The torque tube 38 is preferably a generally cylindrical element and is sized and shaped to be received within the hub body 20. The torque tube 38 includes a first shoulder 40 spaced inboard from a first end 41 of the torque tube against which the first bearing 30 rests and a second shoulder 42 spaced inboard from a second end 43 of the torque tube against which the second bearing 34 rests.

When the torque tube 38 is, positioned within the hub body 20 the shoulders 40, 42 of the torque tube cooperate with the dust seals 32, 36 and counter-bores (shown in more detail below) formed in the interior of the hub or a clip member in a groove to position the bearings 30, 34, which in the example shown are sealed, cartridge-type bearings and thus permit the hub shell to rotate about the torque tube.

The torque tube 38 may be a single piece construction or, as is shown, a multi-part construction. Specifically, the torque tube 38 of the illustrated embodiment includes a first part 38*a*, which is generally an elongated cylinder, and a second part 38*b*, which is generally in the form of a cap that fits to the first part. The first and second parts 38*a*, 38*b* can be fitted by interference fit, welding, gluing, threaded engagement or any suitable joining technique.

Figure 2:
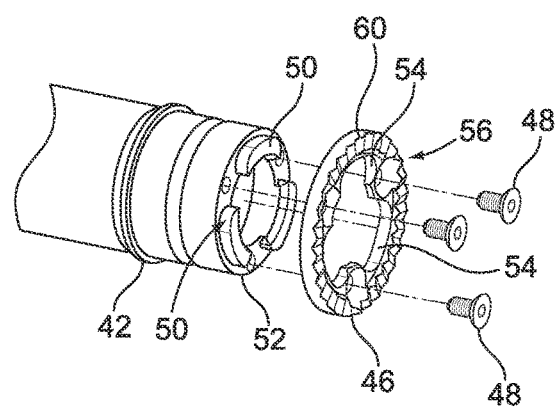
FIG. 2 shows a close up view of one end of the torque tube of FIG. 1.

The torque tube 38 may include at least one boss 50 at each end thereof. In the illustrated example, three bosses 50 are positioned about an annular end face 52 located at each of the torque tube ends. The bosses 50 are shaped and sized to cooperatively fit to matching features 54 of first mating element 44 and second mating element 46. The mating elements 44, 46 are respectively positioned on opposite ends of the torque tube 38 (FIG. 2).

The mating elements 44, 46 are preferably ring shaped parts. The interior of each ring shaped mating element 44, 46 can include matching features 54 in the form of relieved sections shaped and sized to each receive one of the at least one bosses 50. The mating elements 44, 46 are preferably held to the ends of the torque tube 38 with a plurality of fasteners 48, e.g. bolts. It will be understood that the mating elements 44, 46 could be non-ring shapes.

The at least one boss 50 and matching features 54 could take a number of cooperative shapes having the purpose of releasably fixing the mating elements 44, 46 to the ends of the torque tube 38. For example, the mating elements 44, 46 could be formed as or attached to the torque tube 38 by a splined engagement, at least one post, a threaded engagement, or a toothed engagement or any suitable fastening technique.

Preferably, the mating elements 44, 46 are removable to permit access to the bearings, for example, i.e., for maintenance of the hub. Superficially, the mating element 46 resembles a ring gear with an anti-rotation hub feature 56, wherein the anti-rotation hub feature is, for example, a set of teeth 60 located on the outer-facing surface 58 of the ring.

It is a feature of the invention that the mating elements 44, 46 are oriented in a manner so that the anti-rotation hub features 56 at each end of the assembled torque tube 38 are aligned so as to properly engage cooperating mating features in a bicycle fork. It is preferred that the engagement of the bosses 50 and matching features 54 assist in the alignment.

The outer diameter OD (D1) of the mating elements 44, 46 is preferably greater than the diameter (D2) of the end of the torque tube in order to facilitate retention of the seals 32, 36 and bearings 30, 34 in place on the torque tube 38. It will be understood that D1 could be the same as D2, or even smaller. The anti-rotation hub feature 56 of each of the mating elements 44, 46 is shown as a plurality of teeth 60, but could be any number of teeth, such as one or more tooth or tooth-like element. The illustrated teeth are triangular in shape, but other shapes capable of preventing or reducing rotation are contemplated by the invention such as square, ramp, truncated, domed and the like.

The hub 18 of the invention may employ a skewer or other conventional mechanism to attach the hub to a bicycle fork as will be described in more detail in FIG. 9.

Turning to FIG. 6, the interior of the hub body 20 includes a first counter bore 62 located near the first end 31 of the hub body and a second counter bore 64 near the second end 33 of the hub body. The counterbores 62, 64 are sized and shaped to receive the outer diameter of the bearings 30, 34. With the torque tube 38 in position through the hub body 20, it can be seen that the diameter of the torque tube and shoulders 40, 42 are sized to hold the bearings 30, 34 with the first and second counter bores 62, 64. Furthermore, the seals 32, 36 are positioned outboard of respective bearings 30, 34 and function to hold the bearings in position in the counter bores 62, 64 and on the shoulders 40, 42 of the torque tube 38. Other mechanisms of retaining the bearings, such as the use of clips or retaining rings may be employed, as is well known.

Figure 9:
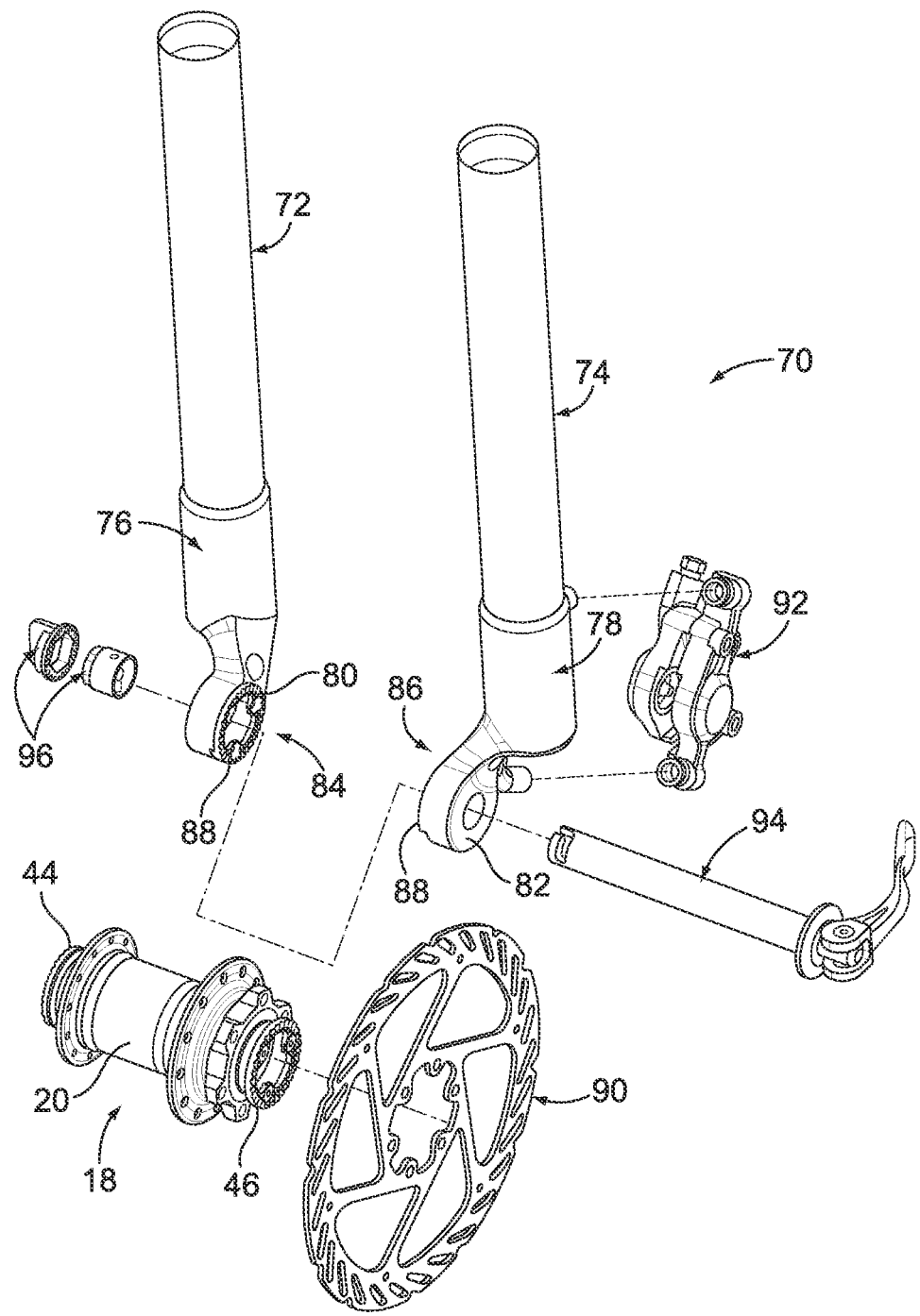
FIG. 9 shows a hub in use with a bicycle fork according to the invention.
Figure 10:
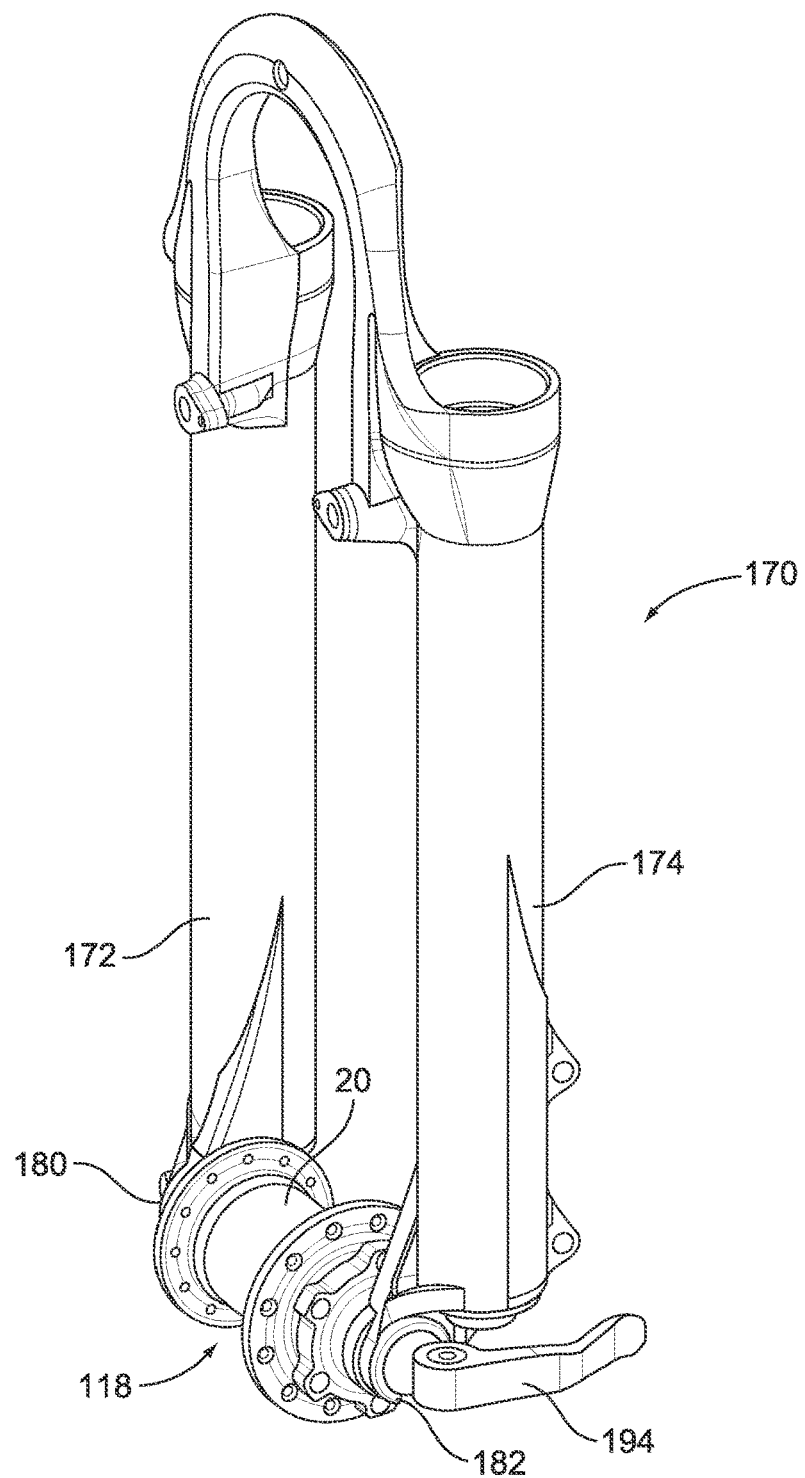
FIG. 10 shows a second embodiment of the invention adapted for use with a non-USD suspension fork.
Figure 11:
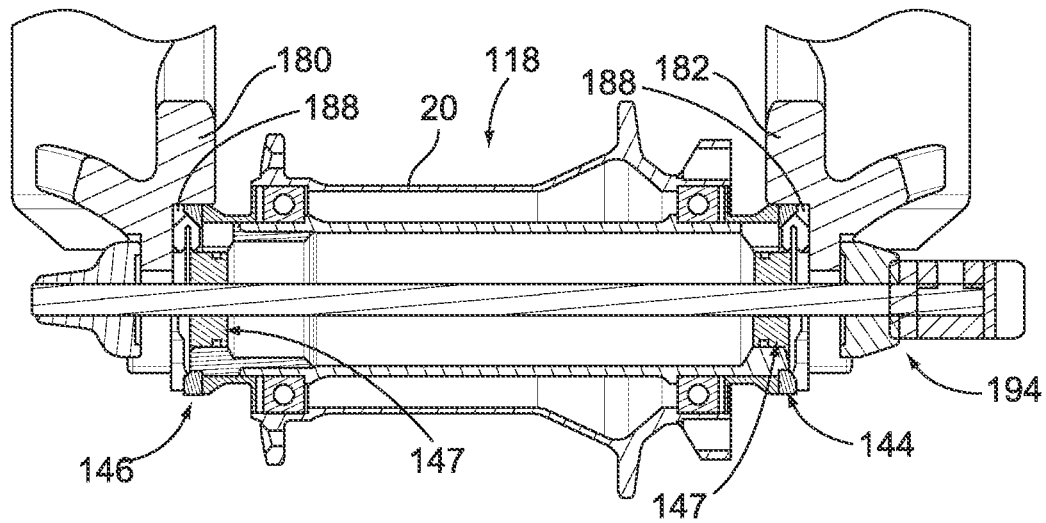
FIG. 11 shows a sectional view of the hub and fork of FIG. 10.
Figure 12:
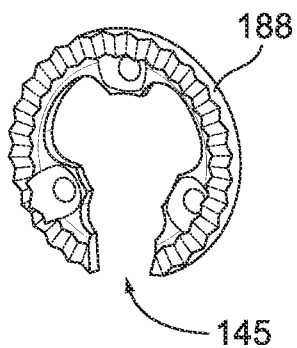
FIG. 12 shows a perspective view of a mating element according to an embodiment of the invention.
Figure 13:
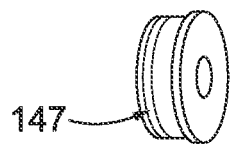
FIG. 13 shows a perspective view of a dropout spacer for a hub according to the invention.

Turning to FIG. 9, a hub 20 according to the invention is shown, for illustrative purposes, in use with a USD suspension fork 70. It will be understood that other types of forks would benefit from the hub 20, and these are also contemplated by the invention. It is believed that a USD fork would benefit the most from a hub according to the invention.

The fork 70 includes first and second stanchions 72, 74. Each stanchion 72, 74 includes a respective fork end member 76, 78 with a hub engaging part 80, 82, which is similar to a fork dropout in position and function by engaging with the hub 18. Each hub engaging part 80, 82 includes a respective inner facing surface 84, 86 with an anti-rotation fork feature 88.

The anti-rotation fork features 88 cooperatively match and mate with or couple with the anti-rotation hub features 56. For example, if the anti-rotation hub features 56 are in the form of triangular teeth, the anti-rotation fork features 88 are also in the form of triangular teeth that mesh with the teeth of the hub features to form a coupling of the features capable of transferring torque thereacross. A number of configurations could comprise the cooperative engagement between the fork and hub wherein the configuration supplies an effective amount of torque transfer from one fork leg (for example, leg 72) through the hub 18 and to the other fork leg (for example, leg 74). Since the mating elements 44, 46 are rotationally fixed to the torque tube 38 and the torque tube does not rotate, the torque tube resists twisting when one or both of the fork legs 72, 74 are exposed to a twisting force.

The hub 18 and fork 70 are shown, for purposes of providing environment, with a brake rotor 90, which is attachable to the brake rotor mounting flange 28 of the hub and a brake caliper 92 which is attachable to the fork stanchion 78. The hub 18 is attached to the fork 70, in the illustrated example, by way of a thru axle skewer 94, which may be inserted through the second hub engaging member 82, through the interior of the torque tube 38, and through the first hub engaging member 80. The thru axle skewer 94 is completed and secured in place by a lock nut assembly 96.

FIGS. 10-13 show a fork 170 and hub 118 according to an embodiment of the invention, where the fork has a pair of fork legs 172, 174; each with a respective conventional drop out 180, 182, and a conventional skewer 194 for holding the hub in the fork dropouts. The hub body 20 of hub 118 may be the same structurally as that of the previous embodiment.

The fork dropouts 180, 182 each include an anti-rotation fork feature 188 in the form of an interrupted ring with a slot 145. The anti-rotation fork feature 188 can be attachable to the dropouts 180, 182 as shown, or formed as part of the dropouts. The slot 145 is oriented on the dropout so as to receive and remove the hub 118 and skewer 194. The shape of the anti-rotation fork feature 188 mates and cooperates with the first and second mating elements 144, 146 to transfer torque from one of the fork legs to the other of the fork legs 172, 174 and thus cause the combined fork and hub assembly to be torsionally stiff.

To accommodate the skewer 194, the hub 118 may include a pair of adapters 147, one at each end of the hub, which are sized, typically with a 5 mm opening, to locate a skewer concentrically in the hub.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A hub and fork assembly for a bicycle, comprising:
    a hub, comprising:
        a hub body,
        a torque tube disposed in the hub body,
        a first outer end face of the torque tube having a first boss, and
        a second outer end face of the torque tube having a second boss;
    a fork, comprising:
        a first hub engaging member having a first anti-rotation fork feature, and
        a second hub engaging member having a second fork anti-rotation feature, the second fork anti-rotation feature extending axially towards the first fork anti-rotation feature,
        wherein each hub engaging member is a closed ring;
    a first hub anti-rotation feature non-rotatably engaged with the first fork anti-rotation feature and the first boss of the first outer end face of the torque tube;
    a second hub anti-rotation feature non-rotatably engaged with the second fork anti-rotation feature and the second boss of the second outer end face of the torque tube; and
    a skewer passing through the first hub engaging member of the fork, the first outer end face of the hub, the second outer end face of the hub, and the second hub engaging member of the fork.

2. The hub and fork assembly according to claim 1, wherein the skewer passes through the first hub anti-rotation feature and the second hub anti-rotation feature.

3. The hub and fork assembly according to claim 2, wherein the skewer passes through the first fork-anti-rotation feature and the second fork anti-rotation feature.

4. The hub and fork assembly according to claim 1, wherein the torque tube transmits torque between the first and second hub engaging members.

5. The hub and fork assembly according to claim 1, wherein the first outer end face of the torque tube comprises a plurality of the first boss.

6. The hub and fork assembly according to claim 5, wherein the second outer end face of the torque tube comprises a plurality of the second boss.

7. The hub and fork assembly according to claim 1, wherein the first and second hub anti-rotation features each have a diameter greater than each of the respective first and second outer end faces of the torque tube.

8. The hub and fork assembly according to claim 1, wherein each of the first and second anti-rotation hub features includes a plurality of teeth.

9. The hub and fork assembly according to claim 8, wherein the teeth have a triangular shape.

10. The hub and fork assembly according to claim 9, wherein each of the first and second anti-rotation fork features includes a plurality of corresponding teeth configured to non-rotatably engage with the teeth of the respective one of the first and second anti-rotation hub features.

* * * * *